United States Patent [19]

Holzberger

[11] 4,329,584
[45] May 11, 1982

[54] APPARATUS FOR RENDERING VISIBLE MOVED OBJECTS

[75] Inventor: Johann Holzberger, Schöfflisdorf, Switzerland

[73] Assignee: Werkzeugmaschinenfabrik Oerlikon-Bührle AG, Zürich, Switzerland

[21] Appl. No.: 128,979

[22] Filed: Mar. 10, 1980

[30] Foreign Application Priority Data

Mar. 27, 1979 [SE] Sweden ............................. 792822

[51] Int. Cl.³ ...................... G01M 23/00; H01J 35/16
[52] U.S. Cl. .......................... 250/358 R; 250/416 TV; 250/523; 250/492.1
[58] Field of Search ............... 250/358, 310, 416 TV, 250/320, 321, 523 R, 492 R, 359 R; 358/111

[56] References Cited

U.S. PATENT DOCUMENTS

| | | | |
|---|---|---|---|
| 3,141,523 | 7/1964 | Dickie | 248/562 |
| 3,368,807 | 2/1968 | Thrasher | 248/562 |
| 3,567,854 | 3/1971 | Tschantz | 358/111 |
| 3,622,786 | 11/1971 | Walker | 358/111 |
| 3,937,965 | 2/1976 | Vassuer | 250/505 |
| 3,992,627 | 11/1976 | Stewart | 250/360 |
| 4,092,537 | 5/1978 | Stewart | 250/314 |

*Primary Examiner*—Harold A. Dixon
*Attorney, Agent, or Firm*—Werner W. Kleeman

[57] ABSTRACT

In order to render visible projectiles in breechblock housings of a firing weapon there is used an apparatus or installation containing an accelerator for generating radiation in a range of 1 to 10 MeV, located in an oscillation-damped protective cabinet or box. A radiation diaphragm is arranged between the weapon and the accelerator. An adjustable oscillation-damped recording equipment-box or cabinet contains an image amplifier, a light deflection tube and a film camera. Lead plates protect the recording equipment against the effects of radiation of short wavelengths.

2 Claims, 4 Drawing Figures

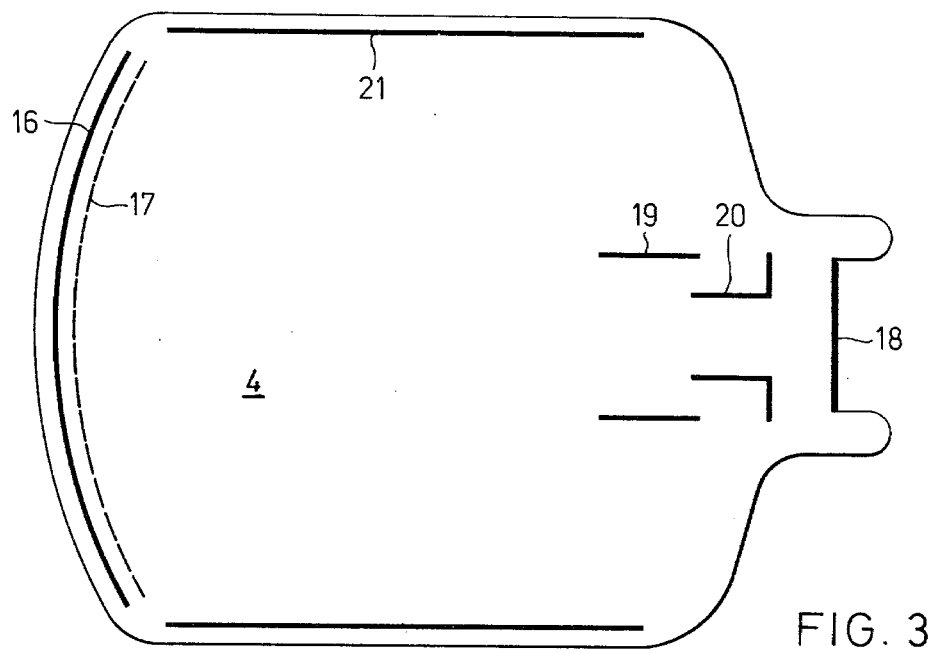
FIG. 3
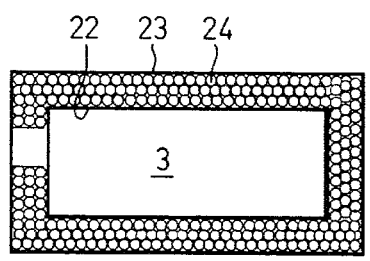
FIG. 4
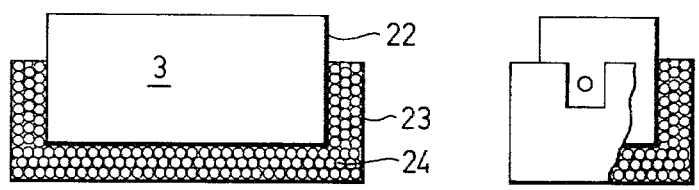

APPARATUS FOR RENDERING VISIBLE MOVED OBJECTS

BACKGROUND OF THE INVENTION

The present invention relates to a new and improved installation or apparatus for rendering visible rapidly moved objects in a relatively thick housing, especially projectiles in a firing weapon.

The equipment should be capable of rendering visible the motion of the projectiles in the breechblock housing during their infeed to the cartridge storage at the barrel of a firing weapon. Further, the apparatus should be capable of photographically fixing such movement and producing images or photographs which render possible measurement of the course of the movement.

There are already known to the art installations of this type in order to render visible bursting fuel rods of nuclear reactors and to film this phenomenon. For this purpose there is employed a constant radiation emitting device or radiation device. The walls which must be penetrated are approximately 1 to 2 centimeters thick. The radiation is directly infed to a camera by means of an image amplifier, the camera being located directly behind the amplifier.

Furthermore, there are known to the art installations of this type for rendering visible the turbine blading or buckets of gas turbines. The radiation generated by an accelerator is converted into visible light at a fluorescent screen, the visible light is received by a television camera and stored at a video recorder. The number of images per second which can be recorded by a television camera is much too small for use with objects which move very fast.

None of the heretofore known state-of-the-art installations is therefore suitable for rendering visible the movement of projectiles in breechblock housings of weapons system during the infeed of the projectiles to the cartridge storage at the weapon barrel of a firing weapon.

SUMMARY OF THE INVENTION

Therefore, with the foregoing in mind it is a primary object of the present invention to provide an improved apparatus for rendering visible moved objects which is not associated with the aforementioned limitations and drawbacks of the prior art.

Another and more specific object of the present invention aims at providing a new and improved construction of apparatus for rendering visible moved objects in a highly efficient, reliable and accurate fashion.

Yet a further significant object of the present development aims at an installation for rendering visible moved objects, which apparatus is relatively simple in construction and design, relatively economical to manufacture, extremely reliable in operation, not readily subject to breakdown or malfunction, and requires a minimum of maintenance and servicing.

Now in order to implement these and still further objects of the invention, which will become more readily apparent as the description proceeds, the apparatus for rendering visible moved objects or the like, as contemplated by the invention, enables radiation penetration through two steel plates, each having a thickness of about 10 centimeters. Between these plates there is located the rapidly moved objects or the like. These rapidly moving objects, having a diameter of 2.2 centimeters and traveling at a velocity of 14 m/sec., still should be sharply imaged, and the path through which the objects move between two images should amount to about 2.8 centimeters.

Now the equipment for realizing these objectives is manifested by the combination of the following features:

(a) an accelerator having a radiation output of about 2000 rad/minute and at least 300 pulses per second;

(b) an adjustable oscillation-damped protection box or cabinet for housing the vibration sensitive accelerator;

(c) an adjustable radiation diaphragm which is arranged between the accelerator and the objects which are to be rendered visible;

(d) an adjustable oscillation-damped recording equipment cabinet or box containing:

lead plates as radiation protection;

image amplifier for an image sequence of at least 500 images or pictures per second for conversion of the short wavelength radiation into visible radiation;

light deflection tube for deflecting the image out of the region of the short wavelength radiation; and a film camera having an intermittent film transport for at least 500 images per second.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a schematic illustration of the image amplifier; and

FIG. 4 shows in respective plan view, side elevation and end elevation the double trough of the protective cabinet or box for the accelerator.

DETAILED DESCRIPTION OF THE PREFERRED EMBODIMENTS

Figure 1:
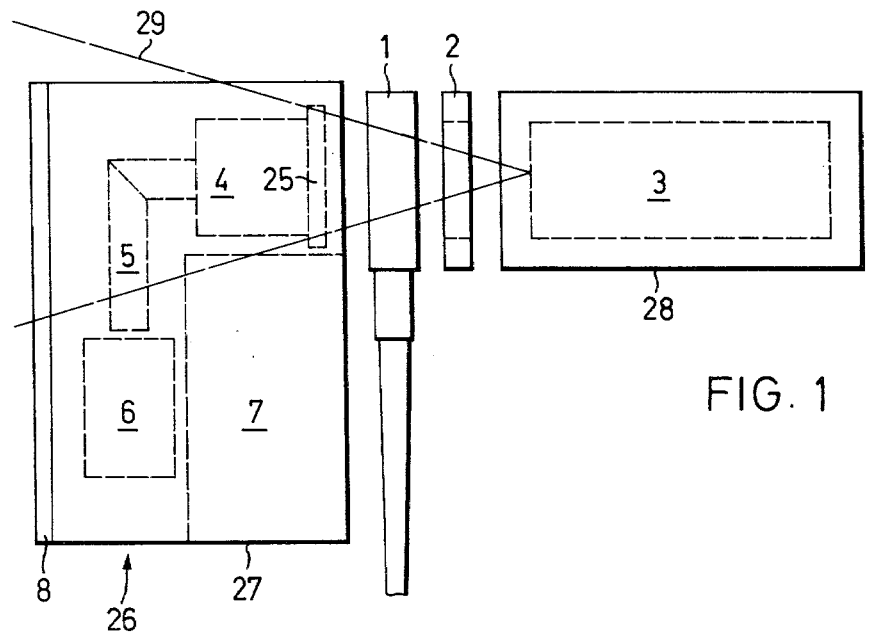
FIG. 1 illustrates in plan view the construction of the entire apparatus or installation for rendering visible moved objects.

Describing now the drawings, and specifically directing attention to FIG. 1, it will be seen that the objects through which there is to be passed the radiation, for instance a weapon system, here shown as a cannon 1, is arranged together with an adjustable radiation diaphragm or screen 2 or equivalent structure, between an electron accelerator 3 and an image amplifier 4, details of which will be described more fully hereinafter. Behind the image amplifier 4 there is located a light deflection or deflecting tube 5, which deflects the light beam to a camera 6 which is protected against radiation of short wavelength. This camera 6 is arranged in a lead housing 6a. To protect the camera 6 there are arranged at two sides of a lead housing 27a, defining a protective cabinet or box 27, the lead walls 7 and 8, as clearly shown in FIG. 1.

Description of the Protective Cabinet or Box 28 of the Accelerator 3

The accelerator 3 is sensitive to jarring or vibrations and the cannon 1, through which there is to be passed the radiation, when fired causes pronounced vibrations or jarring. Therefore, it is necessary to protect the accelerator 3 against vibrations by arranging the same in a protective cabinet or box 28. This protective cabinet or box 28, which also serves for the transport of the accelerator 3, contains a double trough or vat arrangement, generally indicated by reference character 50 in FIGS. 1 and 4. The double trough or vat arrangement 50 contains an inner trough or vat 22 and spaced therefrom an outer trough or vat 23. The space 52 between both of the troughs or trough portions 22 and 23, as best seen by referring to FIG. 4, is filled at the front, at both sides, and at the rear and its base with three respective layers of gas-filled, felt covered ball elements 52, here shown as conventional tennis balls 24, for instance a total of about 4000 tennis balls. Furthermore, although not particularly shown, at the protective cabinet 28 there can be advantageously provided four individually pivotable wheels or casters and three individually adjustable lifting devices, rendering possible placement of the accelerator 3 easily at the desired location and in the desired position. The outer trough or vat 23 is additionally mounted upon conventional oscillation damping elements (not shown).

In consideration of the powder gases which are generated upon firing the projectile, the protective cabinet or box 28 of the accelerator 3 is closed off in a gas tight manner and weather resistant manner. Also in consideration of the transport of the accelerator 3 the protective box or cabinet 28 can be conveniently heated by any suitable heating elements, such as heating coils, generally represented by reference character 54 in FIG. 1. Maintenance of the equipment is rendered possible through the provision of sufficiently large standard access openings or ports.

In order to estimate the requisite oscillation damping it is assumed that the accelerator 3 is not damaged when the vibration-accelerations, caused upon firing the cannon or weapon 1, are smaller than the gravitational acceleration $g = 9.81$ m/sec$^2$, and that the functional reliability is maintained when such vibration-accelerations are smaller than one-third of the gravitational acceleration g.

However, it has been found that during test firing, the outer trough or vat 23 of the protective cabinet 28, and which is mounted upon conventional oscillation dampers, is still exposed to vibration-accelerations of 10 g, and that with the aid of the three layers of ball-like elements 52, here the tennis balls 23, the inner vat or trough 22 of the protective cabinet 28 is only still exposed to vibration-accelerations of about one-third of the gravitational acceleration g. Therefore, there can be beneficially realized through the use of the felt covered tennis balls 23 a damping from 10 g to 0.3 g, something which is not attainable with conventional oscillation damping devices.

The decay time to 10% of the original amplitude of the oscillations caused when firing the weapon, with such oscillation damping being carried out with high frictional effect, due to the felt covering or surface of the tennis balls 24, amounts to less than 50 milliseconds. Measurements carried out on the system have furthermore shown that the oscillations caused by vibrations upon firing the cannon or weapon 1, decay so rapidly because of the damping action realized with the invention, that series firing of the weapon cannot be differentiated from individual or single shot firing when analysed from the standpoint of vibration technology.

Description of the Accelerator 3

Figure 2:
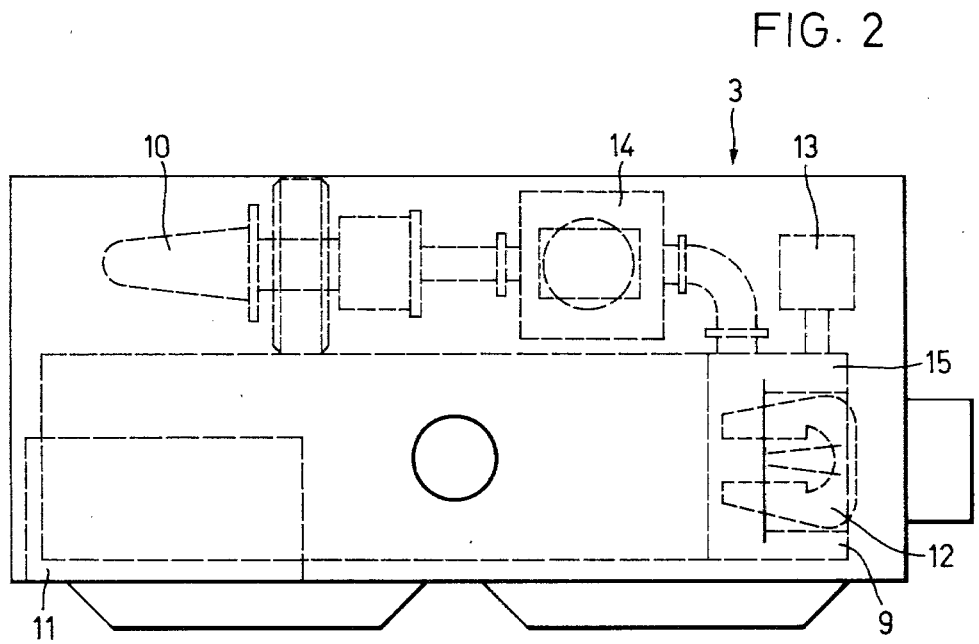
FIG. 2 is a schematic illustration of the accelerator in plan view.

For the Accelerator 3, serving to generate radiation in a range of 1 to 10 mega-electron volts, there can be used commercially available equipment. This equipment, as shown in FIG. 2, comprises an accelerator tube 9 which contains a standing electromagnetic wave for the acceleration of the electrons. Externally of the acceleration tube 9 there is located magnetron means 10 for generating the waves and an electron source 11 for producing free electrons. In order to limit the radiation there is arranged a collimator 12 at one end of the accelerator tube 9. To produce the necessary vacuum there is provided an ion-getter pump 13. Furthermore, there is provided a circulator 14 for deflecting the reflected waves which are intended to be destroyed.

Since this equipment, as stated, is commercially available under the designation "Linatron 1500" from the well known United States firm Varian Associates, further discussion thereof appears to be unnecessary.

Electrons depart from the electron source 11 at one end of the accelerator tube 9 at which there are effective the standing waves of the accelerator tube 9. The field intensity of such standing waves accelerates the electrons. The electrons which are accelerated to approximately the speed of light then impact against a tungsten plate and produce deceleration radiation i.e. radiation caused by particle retardation, which for the most part escapes in a radiation cone having an aperture angle of about 30°.

With the here described embodiment there is used equipment which can operate in three energy ranges, namely at 5 MeV, at 7.5 MeV and at 10 MeV (megaelectron volt-energy); in other words energy corresponding to a throughpassed voltage difference of the electrons of 5, 7.5 or 10 million volts, respectively. The electron current of approximately 70 micro-amperes, flowing at 10 MeV, produces an output of approximately 700 watts at 10 million volts. The radiation output of the accelerator 3 amounts to 2000 rad/minute at 300 pulses/second.

Description Of The Radiation Diaphragm 2

Since the firing weapon 1 which is to be examined possesses, throughout the region of interest, different wall thicknesses, it is necessary to arrange between the weapon 1 and the accelerator 3 a radiation diaphragm 2, in order to thereby prevent that the radiation, during its penetration through the weapon 1, will impinge at individual locations without being attenuated at the image amplifier 4. An unattenuated or non-weakened radiation is capable of destroying the image amplifier 4. From the intensity of the employed radiation it will become apparent that for the radiation diaphragm 2 there are required a great number of lead plates, generally indicated by reference character 2a, in order to effectively protect the image amplifier 4. Tests have shown that by changing the slot width 2b of the radiation diaphragm 2 there can be realized an appreciable image improvement. If only 1% of the recording surface of the image amplifier 4 receives too much radiation, then the sensitivity of the image amplifier 4 becomes so small that the image or picture becomes unusable.

Description of the Protective Cabinet 27 for the Recording Equipment 26

The recording equipment 26 is equally arranged in a protective cabinet or box 27. This protective cabinet 27 is provided with conventional oscillation dampeners and can equally be raised and lowered, typically by standard hydraulic lifting equipment. The image amplifier 4 is directly arranged at a standard oscillation damped plate, not particularly here shown. The light deflection tube 5 and the camera 6 are secured to a conventional optical bank which is located at the aforementioned oscillation dampened plate. The image amplifier 4 is located at the region of the radiation cone 29 emitted by the accelerator 3 and is protected by a thin aluminum plate against powder gas and sound transmitted by air. The camera or photographic equipment 6 is located externally of the radiation cone and is protected by the lead plates 7 and 8 against radiation, these lead plates 7 and 8 having a weight of for instance approximately one ton. Also the side and cover walls of the protective cabinet 27 for the recording equipment 26 is lined with lead walls for protection against scattered radiation.

The protective cabinet 27 protects the recording equipment 26 against powder gas and possesses openings for the passage of the cables for the image amplifier 4 and the camera 6.

Description of The Image Amplifier 4

According to the showing of FIG. 3 the image or picture amplifier 4 contains a first layer 16 composed of cesium iodide which, upon impact of gamma radiation, produces light bursts or flashes. Behind this first layer there is arranged a second layer 17, a so-called photocathode, at which there can penetrate the light bursts or flashes, thereby producing free electrons. These free electrons are located within a focusing electrode arrangement 21. At this location a strong potential or voltage acts upon the electrons, whereby these electrons are accelerated and focused upon a small surface 18 of a phosphorus layer. In front of this surface 18 there are located two anodes 19 and 20.

The sensitivity of the cesium iodide layer is dependent upon the energy range of the radiation, i.e. the number of light bursts, which are produced by the radiation of the accelerator 3 at such cesium iodide layer, is dependent upon the energy of the radiation. However, the efficiency of the cesium iodide layer is not only dependent upon the energy of the radiation, but also upon the layer thickness. The greater the layer thickness that much greater quantum of gamma radiation remains in the cesium iodide layer. In the event that this layer is however too thick, then the forwardly produced light bursts are no longer present at the rear, because they are either absorbed or reflected.

The electrons cause luminescence of the phosphorus layer of the surface 18. The duration of luminescence of the phosphorus layer of the smaller surface 18 determines the number of images or pictures which can be taken per second. The time until the illuminated layer has decayed to one-tenth of its starting brightness amounts to about 1 millisecond. Therefore, it is possible to take as many as five hundred pictures or images per second.

Since there can be formed approximately 176 light quantums from one gamma quantum, and the surface ratio of the inlet screen to the outlet screen amounts to approximately 100:1, there is obtained an amplification factor of 17,600.

Description Of The Conversion-Electron Foil 25

Forwardly of the image amplifier 4 there is arranged a conversion electron foil 25, likewise bringing about an improvement in the quality of the image. Preferably there is used a gold foil having a thickness of about 0.5 to 1.0 mm. This foil 25 serves to convert the so-called "hard" radiation, transmitted by the accelerator 3, into "softer" radiation, which is more suitable for the image amplifier. The foil 25 consists of a material, for instance gold, which when irradiated generates a relatively large amount of conversion-electrons.

Description Of The Light Deflection Tube 5

Behind the image amplifier 4 there is located the light deflection or deflecting tube 5 containing an angled or flexed, telescopic-like extendible tube 5a as well as a deflection mirror (not shown) of highest optical quality. This light deflection tube 5 produces an undesired loss in light, but however must be used since 90% of the radiation of the accelerator 3 passes through the image amplifier 4. This radiation which penetrates through the image amplifier 4 would however completely blacken the film if the camera 6 were otherwise arranged directly behind the image amplifier 4. The light deflection tube 5 renders it possible to arrange the camera 6 externally of the radiation cone. A longer light path from the starting screen of the image amplifier 4 to the lens of the camera 6 therefore can not be avoided.

Description Of The Camera 6

The camera 6 arranged behind the light deflection tube 5 should have as small as possible internal light losses. It operates with intermittent film feed or transport and renders possible taking at least 500 images or pictures per second. Such type camera 6 is mechanically very sensitive and it requires complicated semiconductor electronic hardware. Both the film and also this electronic hardware are therefore carefully protected by lead plates against the action of the gamma quantums of the radiation cone. The camera 6 therefore is surrounded by approximately one ton of lead.

While there are shown and described present preferred embodiments of the invention, it is to be distinctly understood that the invention is not limited thereto, but may be otherwise variously embodied and practiced within the scope of the following claims. ACCORDINGLY What I claim is:

1. An apparatus for rendering visible moved objects within a relatively thick housing, especially projectiles in a firing weapon, comprising:
    an accelerator having a radiation output of about 2000 rad/minute and at least 300 pulses per second;
    an adjustable oscillation-damped protection cabinet for housing the accelerator which is vibration sensitive;
    an adjustable radiation diaphragm arranged between said accelerator and the objects which are to be rendered visible;
    an adjustable oscillation-damped recording equipment cabinet;
    said adjustable oscillation-damped recording equipment-cabinet comprising:
    lead plates serving as radiation protection means;
    an image amplifier for an image sequence of at least 500 images per second for conversion of the short wavelength radiation into visible radiation;

a light deflection tube for deflecting the image out of the region of the short wavelength radiation;

a film camera having an intermittent film transport for at least 500 images per second;

said protection cabinet for housing the vibration sensitive accelerator comprises a double-trough arrangement containing two troughs; and said two troughs forming therebetween a space which is filled with a number of layers of felt-coated elastic balls.

2. An apparatus for rendering visible moved objects within a relatively thick housing, especially projectiles in a firing weapon, comprising:

an accelerator having a radiation output of about 2000 rad/minute and at least 300 pulses per second;

an adjustable oscillation-damped protection cabinet for housing the accelerator which is vibration sensitive;

an adjustable radiation diaphragm arranged between said accelerator and the objects which are to be rendered visible;

an adjustable oscillation-damped recording equipment-cabinet;

said adjustable oscillation-damped recording equipment-cabinet comprising: lead plates serving as radiation protection means;

an image amplifier for an image sequence of at least 500 images per second for conversion of the short wavelength radiation into visible radiation;

a light deflection tube for deflecting the image out of the region of the short wavelength radiation;

a film camera having an intermittent film transport for at least 500 images per second;

said protection cabinet for housing the vibration sensitive accelerator comprising a double-trough arrangement containing two troughs;

said two troughs forming therebetween a space which is filled with a number of layers of felt-coated elastic balls;

said balls being gas filled ball elements.

* * * * *